US006837075B1

(12) United States Patent
Snowdon et al.

(10) Patent No.: US 6,837,075 B1
(45) Date of Patent: Jan. 4, 2005

(54) GLASS FIBER FIXATIVE AND FIXING PROCESS

(75) Inventors: Kenneth Snowdon, Chelmsford (GB); Timothy J Durrant, Paignton (GB); Richard Wilmshurst, Paignton (GB); Christopher G Tanner, Sturmer (GB)

(73) Assignee: Bookham Technology, plc., Abingdon (GB)

( * ) Notice: Subject to any disclaimer, the term of this patent is extended or adjusted under 35 U.S.C. 154(b) by 107 days.

(21) Appl. No.: 09/698,800

(22) Filed: Oct. 27, 2000

(51) Int. Cl.[7] .............. C03C 3/23; C03C 8/10; C03C 8/22
(52) U.S. Cl. ............. 65/406; 65/412; 65/59.4; 65/59.5; 501/22; 501/25
(58) Field of Search .................. 65/59.21, 59.22, 65/59.23, 59.24, 59.4, 59.5, 412, 406; 501/22, 25

(56) References Cited

U.S. PATENT DOCUMENTS

| 3,421,915 A | * | 1/1969 | Letter |
| 3,467,510 A | * | 9/1969 | Knochel et al. |
| 5,143,531 A | * | 9/1992 | Kramer |
| 5,161,049 A | * | 11/1992 | Tanno et al. ............... 359/281 |
| 5,337,387 A | * | 8/1994 | Kramer ...................... 385/76 |
| 5,346,863 A | | 9/1994 | Hikata et al. ............... 501/17 |
| 5,407,119 A | * | 4/1995 | Churchill et al. |
| 5,515,473 A | * | 5/1996 | Yamauchi et al. .......... 385/138 |
| 5,658,364 A | | 8/1997 | DeVore et al. |

FOREIGN PATENT DOCUMENTS

JP  1-114804  *  5/1989

* cited by examiner

*Primary Examiner*—John Hoffmann
(74) *Attorney, Agent, or Firm*—Renner, Otto, Boisselle & Sklar, LLP

(57) ABSTRACT

A glass fixative composition for bonding glass materials to non-glass materials is provided. The fixative composition is selected for its thermal expansion coefficient, its viscosity, its adhesion to glass, melting point, and bond strength. The glass fixative is in particular useful for bonding optical fibers to metallic materials such as Kovar. The low melting point of the glass fixative enables localized heating methods to be used, in particular, as Kovar is a ferromagnetic material, induction heating can be used to form a bond. The bond formed provides a compressive joint which enables the fiber to be hermetically fixed in position.

2 Claims, 4 Drawing Sheets

GLASS FIBER FIXATIVE AND FIXING PROCESS

BACKGROUND OF THE INVENTION

This invention relates to an fixative for glass fibers and to a glass fiber fixing process. The fixing process and fixative enable glass fibers such as are commonly used in optical communications components to be fixed in position with a hermetic seal.

Optical fibers are relatively thin, fragile strands of glass along which an optical signal propagates. For example, see FIG. 1 of the accompanying drawings for a cross-section of a typical optical fiber. An optical fiber 2 typically comprises an glass fiber core 4 covered by a glass cladding material 6. Typically a primary coating 8a, and secondary outer coating 8b are then used to protect the fiber. The outer coating protects the glass fiber and increases the robustness of the optical fiber.

These outer coatings are typically formed from polymeric materials which have low melting points relative to the glass cladding and core, for example acrylic materials and materials such as thermoplastic polyester, for example Hytrel™. Before the optical fiber can be bonded to another surface, the outer coating must be removed to expose the optical fiber core in the region in which a bond is to be formed. This enables a stronger bond to be formed between the glass fiber material and the other surface element to be bonded.

Forming a strong bond between an optical fiber and an optical component is important as many optical components are subject to vibration. Several problems are associated with the bonding process between a glass material and a non-glass material generally, and the high design specifications for optical components exacerbate these problems.

For example, temperature variations require any bond formed ideally to match the thermal coefficients of expansion of the optical fiber and the bonded part to mitigate thermal stress on the optical fiber. Determining the composition of a glass fixative having a sufficiently low melting point to enable an optical fiber to be bonded to a non-glass material without deforming the optical fiber, having a desired thermal coefficient of expansion, and good adhesive properties to both the silica of the optical fiber and the non-glass material is a difficult and complex task. Alternative processes using solder compounds such as Sn/Pb alloys were employed instead.

Most optical components include parts which have a non-glass composition. For example, metallic materials such as Kovar. One known method of bonding glass to such metallic materials requires the glass fiber to be metalised. The metalisation process required a fiber to be stripped to its core and given a metallic coating consisting of a bonding layer and a soldering layer. This enables bonds between the metalised glass fiber and the Kovar material to be soldered.

Metallisation processes have several disadvantages. The fibers have to have their adhesion verified and any masking material used must be removed. Such metallisation processes are time consuming and the fiber strength can be significantly reduced as a result (typically for example by 30%). Other disadvantages include the extensive handling of fibers required by such processes and the associated high fiber breakage rate, and the capital expenditure on plant required by such processes. A further disadvantage of metalisation processes for fiber fixing is that the soldering process can leave behind potentially corrosive fluxes. The preparation of the fibers for metallisation and soldering is moreover time-consuming. Yet another disadvantage of fiber fixing using metalisation processes is that no reworking is possible during either the metalisation or soldering stages.

In complex optical components, a further problem is the necessity of preventing preexisting bonds from being degraded when subsequent bonds are formed in the near vicinity.

The bonds must be sufficiently strong and intact form a hermetic seal between the optical fiber and the corresponding portion of the optical component to isolate the interior of the optical component from the external atmosphere. This enables the atmosphere within the optical component to be isolated and for non-air atmospheres or pure air atmospheres to be used. Moreover, the moisture content of the interior can then be controlled. It is thus important for any bond formed to be sufficiently strong to retain the hermiticity of the seal when subject to thermal stress and/or vibration and/or shock.

SUMMARY OF THE INVENTION

One object of the present invention seeks to obviate or mitigate the above problems associated with conventional fiber fixing processes by providing a glass fiber fixing process.

Another object of the present invention seeks to obviate or mitigate the above problems associated with conventional fiber fixing processes by providing a glass fiber fixative having a desired composition.

Another object of the invention seeks to provide a glass preform composed of the glass fixative.

Yet another object of the invention seeks to provide a bond formed from a glass preform.

Yet another object of the invention seeks to provide a means of localizing heat in the formation of a glass bond between a glass element and a non-glass element.

Yet another object of the invention seeks to provide an optical component containing at least one glass bond.

A first aspect of the invention provides a method of bonding a glass material element and a non-glass material element using a glass fixative preform, the method comprising the steps of: providing a glass preform for bonding the glass material and the non-glass material; heating the preform to melt the preform; and forming a bond with melted glass from the perform, the bond forming between the glass material element and the non-glass material element.

Preferably, in the step of heating the preform, a source of heat localized to the vicinity of the bond is provided to melt the preform.

In the step of heating the preform, the non-glass material element may generate heat which melts the preform. An induced current may flow in the non-glass material element in the region of the preform, the induced current generating sufficient heat to melt the preform. An induction heater may be positioned in the vicinity of the bond so as to cause induction currents to flow in the non-glass material which melt the preform.

Alternatively, in the step of heating the preformn, a laser heater is provided to heat the glass preform until the glass preform melts sufficiently to form a bond.

In the case where the glass material element is a glass fiber, the method may further include the step of removing non-bonding material from the surface of an optical fiber to expose a portion of glass fiber to be bonded.

Preferably, in the step of forming the bond the preform is heated to a temperature in the range 280° C. to 480° C. More preferably, in the step of forming the bond the preform is heated to a temperature in the range 320° C. to 370° C.

In this manner the glass perform is sufficiently melted to flow. In the case where an optical fiber is to be fixed in position within a tube element, the glass is melted sufficiently to flow in a capillary manner between the fiber and the tube.

A second aspect of the invention seeks to provide a glass fixative for bonding glass elements to non-glass elements, the fixative having a composition including a lead oxide.

The glass fixative may further include at least one taken from the group including: lead fluoride, and an oxide of: niobium, copper, bismuth, iron, zinc, titanium, aluminum, boron, silicon, and calcium.

Preferably, the glass fixative has a composition including lead fluoride and an oxide of each of the following: lead, niobium, copper, bismuth, iron, zinc, titanium, aluminum, boron, silicon, and calcium.

Preferably, the oxide of titanium is titanium dioxide.

Preferably, the glass fixative composition includes the following: PbO; PbF$_2$; Nb$_2$O$_5$; CuO; Bi$_2$O$_3$; Fe$_2$O$_3$; ZnO; TiO$_2$; Al$_2$O$_3$; B$_2$O$_3$; SiO$_2$; and CaO.

More preferably, the glass fixative composition includes the following constituents in the following proportions: PbO 60% wt to 65% wt; PbF$_2$ 2% wt to 5% wt; Nb$_2$O$_5$ 2% wt to 5% wt; CuO 0.5% wt to 1.5% wt; Bi$_2$O$_3$ 6% wt to 7% wt; Fe$_2$O$_3$ 2% wt to 3% wt; ZnO 2% wt to 3% wt; TiO$_2$ 5% wt to 7% wt; Al$_2$O$_3$ 0.1% wt to 0.3% wt; B$_2$O$_3$ 2% wt to 3% wt; SiO$_2$ 0.1% wt to 0.4% wt; and CaO 1 to 1.5% wt.

The glass fixative may have a melting point less than 500° C. Preferably, the glass fixative has a melting point less than 480° C. More preferably, the glass fixative has a melting point between 280° C. and 410° C.

Preferably, the glass fixative has a softening point around 320° C. to 370° C. The glass fixative preferably has a glass transition temperature between 280° C. and 300° C.

Preferably, the glass fixative has a thermal coefficient of expansion of 6 to 8 p.p.m/°C.

A third aspect of the invention seeks to provide a fixative preform for bonding a glass material element to a nonlass material element, the preform having a composition including lead oxide.

Preferably, the fixative perform further includes at least one taken from the group including: lead fluoride, and at least one oxide of: niobium, copper, bismuth, iron, zinc, titanium, aluminum, boron, silicon, and calcium.

Preferably, the fixative perform. composition includes the following: PbO; PbF$_2$; Nb$_2$O$_5$; CuO; Bi$_2$O$_3$; Fe$_2$O$_3$; ZnO; TiO$_2$; Al$_2$O$_3$; B$_2$O$_3$; SiO$_2$; and CaO.

Preferably, the fixative perform composition includes the following constituents in the following proportions: PbO 60% wt to 65% wt; PbF$_2$ 2% wt to 5% wt; Nb$_2$O$_5$ 2% wt to 5% wt; CuO 0.5% wt to 1.5% wt; Bi$_2$O$_3$ 6% wt to 7% wt; Fe$_2$O$_3$ 2% wt to 3% wt; ZnO 2% wt to 3% wt; TiO$_2$ 5% wt to 7% wt; Al$_2$O$_3$ 0.1% wt to 0.3% wt; B$_2$O$_3$ 2% wt to 3% wt; SiO$_2$ 0.1% wt to 0.4% wt; CaO 1 to 1.5% wt.

The fixative preform may further include at least one substance taken from the group including: nickel, cobalt, kovar or magnetite.

The fixative preform may alternatively include at least one substance taken from the group including: carbon black, graphite, and black metallic oxides.

A fourth aspect of the invention seeks to provide a glass material bond formed between a glass material element and a non-glass material element. The glass material bond is formed using the glass fixative described above.

Preferably, the glass material element is an optical fiber.

The non-glass material element may have a metallic characteristic and preferably has a ferromagnetic or ferromagnetic characteristic.

Preferably, the composition of the glass fixative is as described above.

Preferably, the bond is hermetic.

A fifth aspect of the invention seeks to provide an optical component containing a glass bond, the glass bond having the features described herein.

The invention exploits the ferromagnetic characteristic of materials such as Kovar to used induction heating as a means of locally heating a glass preform provided to bond a glass material element in an optical assembly and a non-glass material element. The induction heating advantageously enables the preform to melt to form a hermetic seal between the ferromagnetic material and glass material without unduly heating other portions of the optical assembly.

The use of a glass fixative for forming hermetic seals is advantageous as this removes the need to metalise optical fibers. This is advantageous as it obviates the weakening of the optical fibers associated with the metalisation process.

Advantageously, the glass fixative enables a relative strong bond to be formed between the optical fiber and another bonding element, which retains the optical fiber in a compressive state. When the glass fixative is used to fix a glass element to a metallic element, in particular to a ferromagnetic element, a localized induction heating process can be used to melt the glass fiber fixative.

The composition of the glass fixative is selected so that the thermal expansion coefficient, viscosity, adhesive characteristics and melting point of the glass fixative fall within desired ranges. The ability to select the softening and melting points of the glass fixative is advantageous. A series of bonds can be formed in relatively close proximity to each other, providing the melting point of each successive bond is sufficiently raised above the temperature at which earlier bond(s) soften. The formation of a series of bonds in the vicinity of each other is further enhanced when localized heating is used to melt the glass preforms forming the bond.

Advantageously, the glass fixative may melt at a temperature below 400° C. Such low processing temperatures and localized heating help to mitigate damage to the nearby fiber coating, particularly when the coating is formed from a plastic material such as acrylic and Hytrel™.

Advantageously, localized heating to be provided such that forming a subsequent bond in the vicinity of an earlier bond results in less thermal stress on the earlier bond. The localized heating method results in the optical bond stressing the optical fiber such that it is bonded in a compressive state. This enhances the ability of the bonded fiber to withstand shock and vibration.

Advantageously, the glass preform can be stamped into an annular shape to facilitate positioning of the glass fixative around the optical fiber to be bonded. Advantageously, the melting point of the glass perform and the viscosity of the molten glass are sufficiently low to enable the melted glass to flow to form an extended bonding area.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF PREFERRED EMBODIMENTS

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
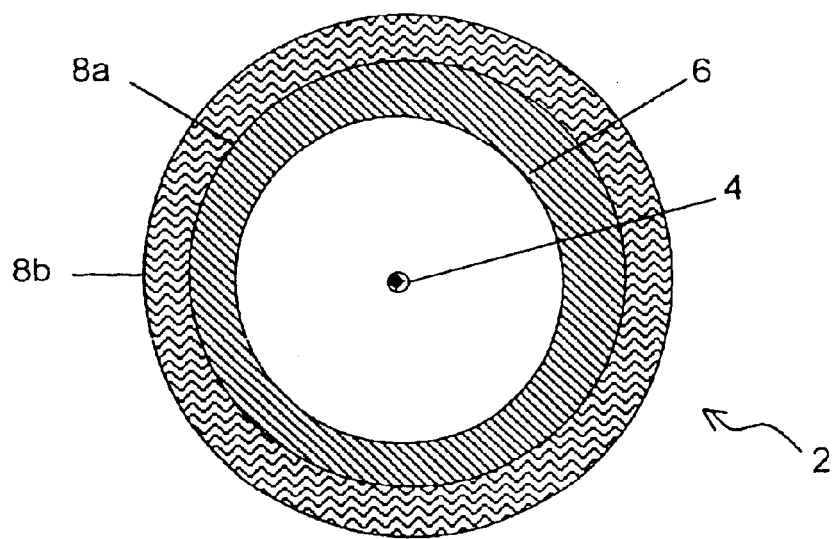
FIG. 1 sketches a cross-section of an optical fiber.
Figure 2:
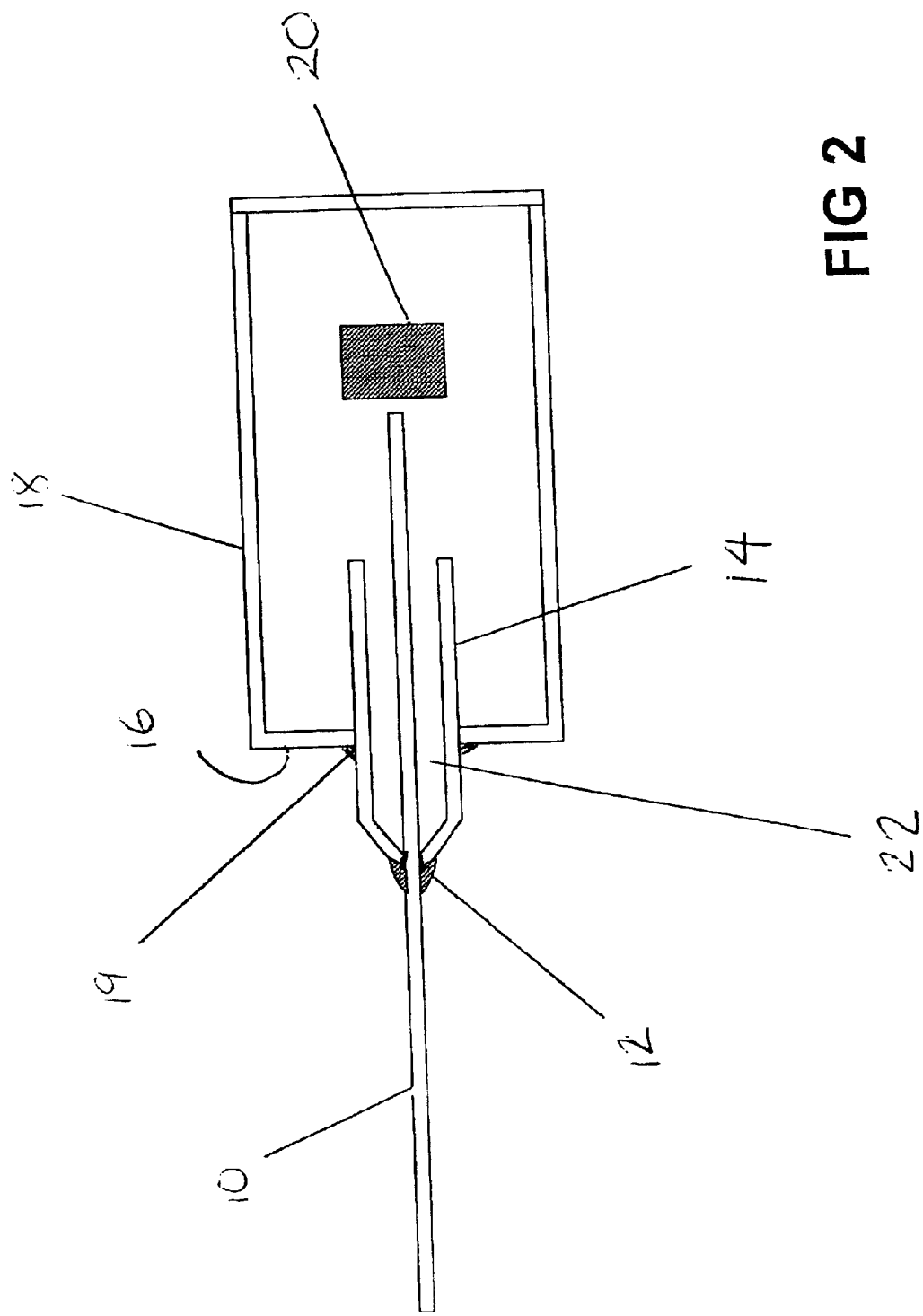
FIG. 2 sketches a fiber fixed in position relative to an optical component according to the invention.

Referring now to FIG. 2 of the accompanying drawings, a glass element, here an optical fiber 10 is bonded by a glass fixative bond 12 to a non-glass material element, here a hypo tube 14. The hypo tube 14 is comprises a non-glass material, for example Kovar, which is a nickel/iron alloy. In other embodiments of the invention other materials may be wish to be bonded to the optical fiber.

The hypo tube 14 is bonded to walls 16 of package 18, either using another glass fixative or a solder bond 19. Within the package 18, the optical fiber 10 extends from the hypo tube 14 towards an optical component 20, for example, a laser chip, which may transmit and/or receive optical signals. The correctly positioned optical fiber enables optical signals to be communicated between the optical component 20 and the environment external to the package 16. The optical fiber 10 is supported generally within the hypo tube 14 by a filler material 22, for example, a resin. It is important that the optical fiber 10 is firmly maintained in a position relative to the optical component 20, so that optical signals can be communicated with minimal insertion loss. However, other supporting structures or just the glass bond itself may be the source of support in alternative embodiments.

Generally, the glass bond 12 is formed using a glass fixative having a composition selected to provide several characteristics. The composition is selected to have a suitable softening and melting temperatures, good adhesion to glass and the corresponding non-glass material, a desirably low viscosity, and an appropriate thermal expansion coefficient to provide a strong compressive bond. These characteristics enable a strong, long-lasting bond to be provided between the glass material element and nonlass material element which are to be fixed.

The characteristics of the glass fixative for bonding the optical fiber 10 to the Kovar tube 14 were selected to ensure that the bond 12 formed by the glass fixative is hermetic, strong, resilient and matches the thermal coefficients of expansion of both the glass of the optical fiber and the Kovar material. The viscosity is low to enable the bond to form by melted glass flowing in a capillary manner along the tube. The glass fixative also has good adhesion to the glass fiber and the Kovar tube.

The composition of a suitable glass fixative is based on lead oxide. A lead oxide based glass has a low melting point glass <500° C. By including an appropriate proportion of bismuth oxide, the softening temperature can be lowered, and a glass with the correct viscosity created which can flow around the Kovar tube and silica glass fiber. Copper oxide and zinc oxides stabilize the melt and prevent devitrification. In addition, zinc oxide increases the environmental stability of the glass seal in ambient atmospheres during use.

Whilst the melting temperature of the glass fixative can be selected to lie in the range, 280° C. to 450° C., it is desirable if the upper processing temperature does not exceed 410° C. It is important that the upper processing temperature does not exceed 410° C. as this temperature is sufficiently low to ensure that a polymeric fiber coating, for example, acrylic or Hytrel™, is not damaged when the bond is formed. Ideally, therefore, the flow temperature of the glass fixative lies in the range 280° C. to 410° C.

Restricting the processing temperature to this range limits the composition of the glass fixative to a relatively narrow range, as many glasses do not have the desired combination of a melting point in this range together with a sufficiently low viscosity and adhesion to the Kovar or glass fiber.

To provide a glass fixative selected with a softening point around 320° C. to 370° C. and a glass transition temperature between 280° C. and 300° C., the composition of the glass fixative is lead oxide based. This temperature range enables glass fixative to flow sufficiently to bond to both the Kovar tube 14 and silica fiber 10 without thermal damage to nearby polymeric components such as a acrylic primary coating and a Hytrel™ secondary coating on the fiber 10. To ensure that the Kovar tube joint can be soldered subsequently to the package walls 16 without damage to the glass fixative bond 12, the softening point temperature and glass transition temperature are selected to be higher than the reflow processing temperature of eutectic tin/lead solder (typically 220° C.). This enables the Kovar tube joint to retain its hermetic seal when subjected to subsequent assembly steps (i.e., the glass bond 12 remains intact).

It is important that a strong bond is formed with the optical fiber 10, i.e., that a compression joint is formed. However, if too strong a bond is formed the fiber will be subject to stress and may break. Such stresses can, in addition to generating fiber breakage, also result in the light transmission properties of the optical fiber being degraded. This is a particular problem in polarization maintaining fibers.

To ensure that a stable compressive, hermetic seal is formed by the glass fixative around the fiber 10 in the Kovar hypo tube 14, the thermal expansion coefficient (TEC) of the glass fixative must match that of the Kovar (6 MK−1 (6 to 6.5 p.p.m./°C.)). For a silica optical fiber, the TEC is typically 0.6 to 2 p.p.m./°C. If the TECs cannot be sufficiently matched by the glass fixative, then when the whole optical assembly is cooled down after processing, the optical fiber may be damaged and/or the hermicity of the seal broken.

Generally, glasses which have low melting points such as are required by the invention have much higher TECs. This is overcome by the inclusion of a TEC modifying substance such as niobium titanate which lowers the TEC to the desired range. The base lead oxide glass has a TEC of 11.5 MK−1 (11.5 ppm/°C.). To enable a TEC match, ceramic, filler particles based on lead and niobium titanates (for example $TiO_2$ and $NbO_2$ oxides having a TEC around 3 MK−1) are added in sufficient quantities. For example, filler particles may be included at the level of a 20–55% volume fraction to the glass preform particles. The particle size distribution is typically centered around 5 microns.

In one embodiment of the invention, the glass fixative composition includes filler particles based on magnetite ($Fe_3O_4$). The magnetite reduces the TEC of the glass fixative and increases the ferrimagnetic coupling to the RF induction heating. This improves the thermal processing of the low melting point glass.

In other embodiments, metal fluorides such as $PbF_2$ are added to the glass fixative to aid wetting of the glass to the silica glass fiber and Kovar by a fluxing action. This lowers the melting temperature of the fixative and removes metal oxides from the Kovar surface.

The selected composition of the glass fixative provides a TEC in the range 6.5 to 8.5 p.p.m/°C.

The glass fixative used to form a glass bond between a ferromagnetic metallic element and a glass element such as the Kovar tube 14 and the optical fiber 12 of FIG. 2 has the following composition: PbO 60% wt to 65% wt; $PbF_2$ 2% wt to 5% wt; $Nb_2O_5$ 2% wt to 5% wt; CuO 0.5% wt to 1.5% wt; $Bi_2O_3$ 6% wt to 7% wt; $Fe_2O_3$ 2% wt to 3% wt: ZnO 2% wt to 3% wt; $TiO_2$ 5% wt to 7% wt; $Al_2O_3$ 01% wt to 0.3% wt; $B_2O_3$ 2% wt to 3% wt; $SiO_2$ 0.1% wt to 0.4% wt; CaO 1 to 1.5% wt. Slight modifications to the above composition may be made to bond an optical fiber to other non-glass substances.

In a specific embodiment of the invention provided glass fixative having the composition of: PbO 62.5% wt.; $PbF_2$ 3.5% wt; $Nb_2O_5$ 3.5% wt; CuO 1% wt; $Bi_2O_3$ 6.5% wt; $Fe_2O_3$ 2.5% wt; ZnO 2.5% wt; $TiO_2$ 6% wt; $Al_2O_3$ 0.2% wt; $Bi_2O_3$ 2.5% wt; $SiO_2$ 0.25% wt; and CaO 1.25% wt.

Figure 3:
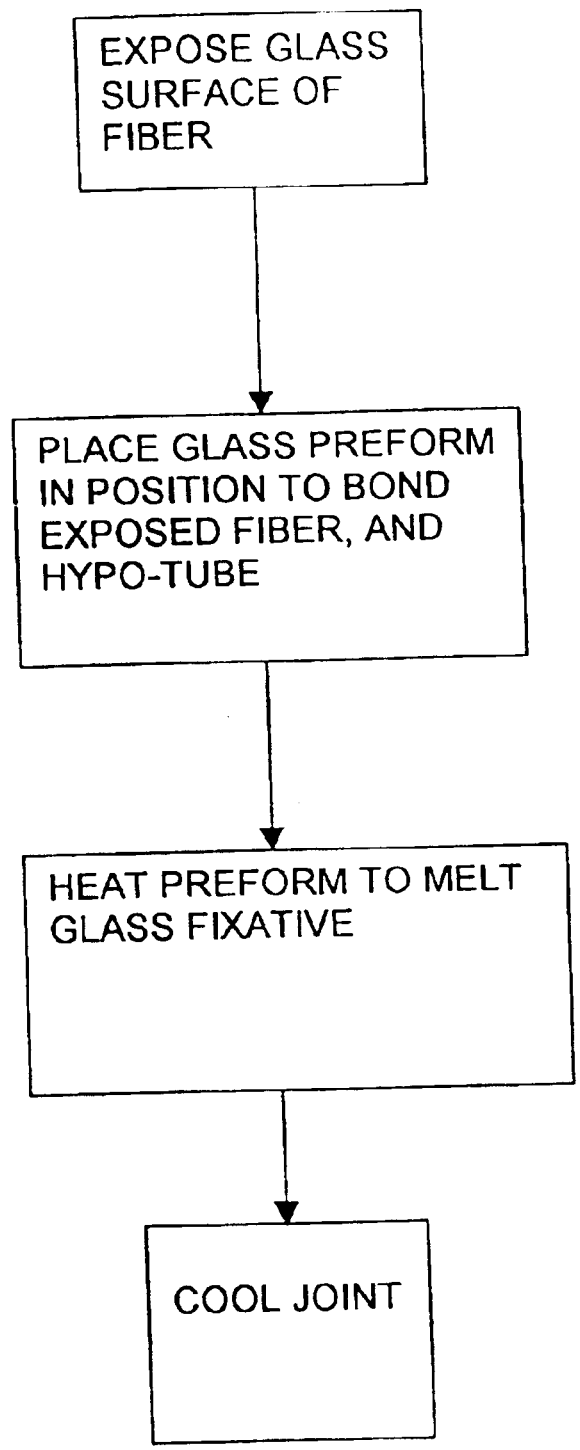
FIG. 3 illustrates steps in a glass fixing process.

Referring now to FIG. 3, the process steps in forming glass bond are described. In FIG. 3, a method of forming a bond between a glass element and a non-glass material element such as an optical fiber and an adjacent surface of a kovar hypo tube is described. The method requires a glass surface to be bonded. Therefore, prior to bonding the optical fiber to the kovar hypo tube, removal of the polymeric coating(s) must be completed to expose the glass the fiber core. Typically, the fiber core is exposed for approximately 5 mm from the joint region.

A glass preform comprising a glass fixative having a composition as described above is then provided in an appropriate position to enable a bond to be formed between the exposed glass fiber and the Kovar hypo tube. The glass preform comprises the glass fixative described above in a compressed format so that the fixative retains its shape. The preform may be formed under slight pressure. Typically, therefore the preform provides a compressed agglomeration of low melting lead oxide-based glass particles such as previously described.

The preform is positioned on the surface of the glass fiber so that when the preform is heated, then melted, the molten glass flow between the glass fiber and the Kovar in the appropriate place. In practice, the optical fiber is threaded through the Kovar tube and an annular glass preform until the glass preform is positioned adjacent to the Kovar tube. However, other shapes of preform may alternatively be used.

Figure 4:
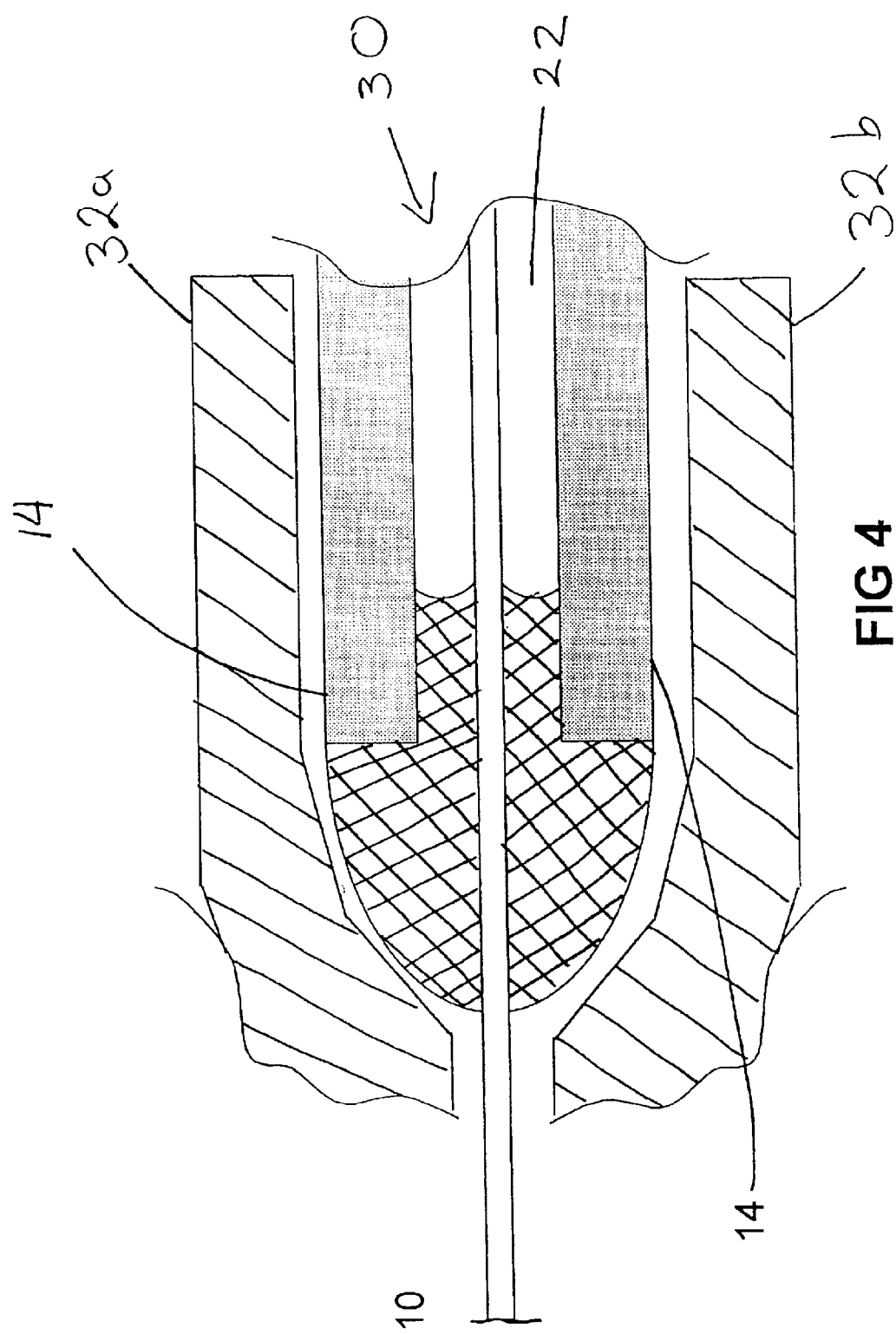
FIG. 4 is an enlarged cross-section of the glass fixed fiber joint illustrated in FIG. 2 and illustrates how an induction heater can be used as a localized heating source.

The preform is heated by suitable localized heating means, for example, an induction heater can be used for bonding the optical fiber to a ferromagnetic material such as Kovar. Referring now to FIG. 4, the fiber/dhypo tube joint assembly 30 is placed within jaws 32a, b of an induction heater. The jaws 32 conform sufficiently to the shape of the hypo tube surface to enable inductive currents to be generated within the Kovar tube. Typically, currents of 12 mA are cycled through the Kovar material for 10 to 15 seconds. These currents generate sufficient heat to melt the glass preform so that a strong adhesive bond is formed between the glass fiber and a portion of the interior surface of the Kovar hypo tube. The glass preform flows along the tube as it melts, thus enabling a relatively large bonding area to form. Typically, if the capillary gap between the glass fiber and the inner walls of the hypo tube is / then the capillary action extends the bonding area up to around 3/ along the direction of the hypo tube axis. This relatively large bonding area provides a high level of support to the fiber.

A fast localized heating mechanism is desirable as it prevents damage to the polymeric fiber coating material during the bonding process. Other fast heat methods can be employed however, providing these can be sufficiently localized, for example, laser heating. Laser heating methods can be used to bond glass to materials which are not suitable for inductive heating methods.

Laser heating effects can be enhanced by incorporating substances in the glass fixative which enhance the absorption of the lasing radiation. For example, carbon black, graphite, or black metallic oxides can increase the glass coupling to $CO_2$, Nd/YAG and semiconductor laser heating sources.

When a glass element is to be bonded to a metallic or ferromagnetic material such as Kovar, induction heating is utilized in the best mode contemplated by the inventor. At least the portion of the tube and fiber to be bonded are positioned in an induction heater. The induction heater provides a suitable induction current which induces current flow in the surface region of the metallic material. The amount of heat generated depends on the type of metallic material and the strength of the inductive currents produced in the surface region of the metallic material.

Heat generated by the induced currents melts the glass preform and the molten glass is able to flow to form a suitable bond. As FIG. 4 shows, the glass melts and is drawn along the tube in a capillary manner so as to form an elongated seal around the optical fiber. As the glass fixative cools it forms a hermetic, compressive seal around the optical fiber which bonds the optical fiber to the adjacent Kovar material of the tube. Typically cooling cycles take 10 seconds.

The inductive heating effect can be increased by doping the glass preform itself with ferromagnetic or ferrimagnetic substances. For example, nickel, cobalt, kovar or magnetite ($Fe_3O_4$) can be added to the preform to increase the inductive coupling and reduce the heating cycle times below 15 seconds.

In one embodiment of the invention, the induction heater comprises an inducting coil which generates a square pulse of 250–280 mA which is generally applied for 10–12 seconds. These conditions are sufficient to heat up, melt the glass preform, wet the Kovar tube and silica fibre and form the hermetic seal.

One specific embodiment of an induction heater comprises an internal coil having a diameter of 3 mm and a coil depth of 1.5 mm. The internal coil is used to localize heating at the tip of the jaws 32a, b, in the vicinity of the preform. The Kovar tubes are clamped in a non-ferrous jig to ensure that heat is not able to transfer to the plastic fiber coatings. The Kovar tubes are heated in multiples, for example batches of 6 tubes can be heated for 12 seconds. This is an extremely fast process over known processes such as, for example, the time to form a soldered metalised joint which is typically one minute per joint.

The frequency of the induction heater is tuned to 96 kHz and heat is localized at the tip of the jaws 32a. 32b in the vicinity of the preform. Temperatures around 350° C. are reached using 32 kW of power and 12 seconds of applied current.

One embodiment of the invention enables a series of glass bonds to be formed. For example, both the first bond 12 and the second bond 19 sketched in FIG. 2 can be formed from glass fixatives. In FIG. 2, the first bond is a standard hermetic bond between the optical fiber 12 and the Kovar hypo tube 14. The second bond 19 seals the hypo tube 14 within the package 18. This bond ensures that the optical fiber 10 is aligned with the laser chip 22 within the package 18. To ensure that the formation of the second bond 19 does not damage the first bond 12, the composition of the second glass fixative is modified from the composition of the fixative used to form the first bond 12 to ensure that the melting temperature of the second glass fixative is sufficiently high above the softening temperature of the first glass bond.

Several advantages are provided by using a glass fixative instead of a solder. These include the removal of the necessity to metallize the optical fibers and the ability to form strong bonds in a fast and efficient manner, as well as the ability to rework the bond by softening the fixative.

It is to be understood that modifications and variations can be made to the above description of the invention which have not been explicitly described hereinbefore but which nonetheless are apparent to the person skilled in the art. The scope of the invention is therefore not to be determined by the above description alone but is instead determined by the accompanying claims when construed in conjunction with the accompanying drawings and foregoing description.

What is claimed is:

1. A structure comprising a bond formed between an optical fibre and a metallic element with a glass fixative, the bond having been formed by positioning a glass preform adjacent the optical fibre and the metallic element and inducing current flows in the metallic element to generate sufficient heat to melt the preform, wherein the glass fixative composition includes all of the following: $PbO$; $PbF_2$; $Nb_2O_5$; $CuO$; $Bi_2O_3$; $Fe_2O_3$; $ZnO$; $TiO_2$; $Al_2O_3$; $B_2O_3$; $SiO_2$; and $CaO$.

2. A structure comprising a bond formed between an optical fibre and a metallic element with a glass fixative, the bond having been formed by positioning a glass preform adjacent the optical fibre and the metallic element and inducing current flows in the metallic element to generate sufficient heat to melt the preform, wherein the glass fixative composition includes the following constituents in the following proportions: $PbO$ 60% wt to 65% wt; $PbF_2$ 2% wt to 5% wt; $Nb_2O_5$ 2% wt to 5% wt; $CuO$ 0.5% wt to 1.5% wt; $Bi_2O_3$ 6% wt to 7% wt; $Fe_2O_3$ 2% wt to 3% wt; $ZnO$ 2% wt to 3% wt; $TiO_2$ 5% wt to 7% wt; $Al_2O_3$ 0.1% wt to 0.3% wt; $B_2O_3$ 2% wt to 3% wt; $SiO_2$ 0.1% wt to 0.4% wt; $CaO$ 1% to 1.5% wt.

* * * * *